US005752110A

United States Patent [19]
Iijima et al.

[11] Patent Number: 5,752,110
[45] Date of Patent: May 12, 1998

[54] APPARATUS THAT USES A PHOTOGRAPHIC FILM

[75] Inventors: Shuji Iijima, Yamato; Akio Nishizawa, Kawasaki, both of Japan

[73] Assignee: Nikon Corporation, Tokyo, Japan

[21] Appl. No.: 705,126

[22] Filed: Aug. 29, 1996

[30] Foreign Application Priority Data

Sep. 4, 1995 [JP] Japan ................... 7-226528

[51] Int. Cl.⁶ ........................... G03B 17/02; G03B 17/24
[52] U.S. Cl. ........................ 396/319; 396/415; 396/538
[58] Field of Search ................... 396/319, 320, 396/440, 441, 442, 535, 538, 415

[56] References Cited

U.S. PATENT DOCUMENTS

| | | | |
|---|---|---|---|
| 3,383,068 | 5/1968 | Winkler et al. | 242/332.8 |
| 3,387,546 | 6/1968 | Winkler et al. | 396/415 |
| 3,463,071 | 8/1969 | Winkler et al. | 396/415 |
| 4,482,229 | 11/1984 | Sugiura | 396/415 |
| 4,530,582 | 7/1985 | Hara et al. | 396/440 |
| 5,307,100 | 4/1994 | Kubo | 396/319 |
| 5,477,290 | 12/1995 | Takeshita | 396/319 |
| 5,483,313 | 1/1996 | Nagao et al. | 396/319 |
| 5,502,528 | 3/1996 | Czarnecki et al. | 396/319 |
| 5,568,212 | 10/1996 | Schimizu | 396/319 |
| 5,585,876 | 12/1996 | Kobayashi | 396/440 |

*Primary Examiner*—A. A. Mathews
*Attorney, Agent, or Firm*—Oliff & Berridge, P.L.C.

[57] ABSTRACT

An apparatus in which photographic film is fed out of a film cartridge and is led through a film path to a spool chamber to be wound on a take-up spool includes a film guide that extends from the end of the film path toward the spool chamber. The film guide reliably guides the film, which has been led to the spool chamber, to the take-up spool. The film guide ensures that the film is properly wound on the take-up spool by preventing it from prematurely curling within the spool chamber. The film guide also ensures that magnetic recording operations performed on the film by a recording head, if present, are also reliably performed.

20 Claims, 4 Drawing Sheets

APPARATUS THAT USES A PHOTOGRAPHIC FILM

BACKGROUND OF THE INVENTION

1. Field of the Invention

This invention relates to an apparatus that uses a photographic film, such as a camera, and more particularly to an apparatus that uses a photographic film, which can reduce film loading errors.

2. Description of Related Art

In known cameras, the photographic film is automatically fed from a film cartridge loaded in the camera. The film is led through a film path to a spool chamber, and is wound on a take-up spool. In this type of camera, the probability of occurrence of film loading errors is higher than with a conventional camera where the user pulls the leading edge of a film from a cartridge and engages the leading edge of the film on the take-up spool.

SUMMARY OF THE INVENTION

It is an object of the invention to reduce film loading errors in cameras that automatically feed the film from a cartridge.

In a camera embodying the invention, a photographic film is fed from a film cartridge loaded in the apparatus, through a film path, and into a spool chamber. In the spool chamber, the film is wound up on a take-up spool.

In one aspect of the invention, a film guide is provided in the apparatus. The film guide is located at the entrance to the spool chamber, at the end of the film path, and it projects toward the take-up spool. The film guide guides the film, which has been led to the spool chamber, to the take-up spool so that the film is properly wound on the take-up spool. The film guide extends substantially parallel to the film path.

The apparatus may further comprise a magnetic head positioned at the spool chamber side of the end of the film path. The magnetic head records information on the film and/or reads information magnetically encoded on the film.

The apparatus further comprises a photographic lens barrel for guiding light from a photographic subject to the film. The film guide is fixed to the camera body by an attachment portion, which is arranged along an outer periphery of the photographic lens barrel.

The length and the position of the film guide is selected so that film wound on the take-up spool does not contact the film guide, regardless of the amount of film wound up on the take-up spool.

BRIEF DESCRIPTION OF THE DRAWINGS

A description of the invention will be given in conjunction with the following drawings, wherein like elements are identified with like reference numerals, and wherein.

DETAILED DESCRIPTION OF PREFERRED EMBODIMENTS

Preferred embodiments of the invention will be described with reference to FIGS. 1 through 4.

Figure 1:
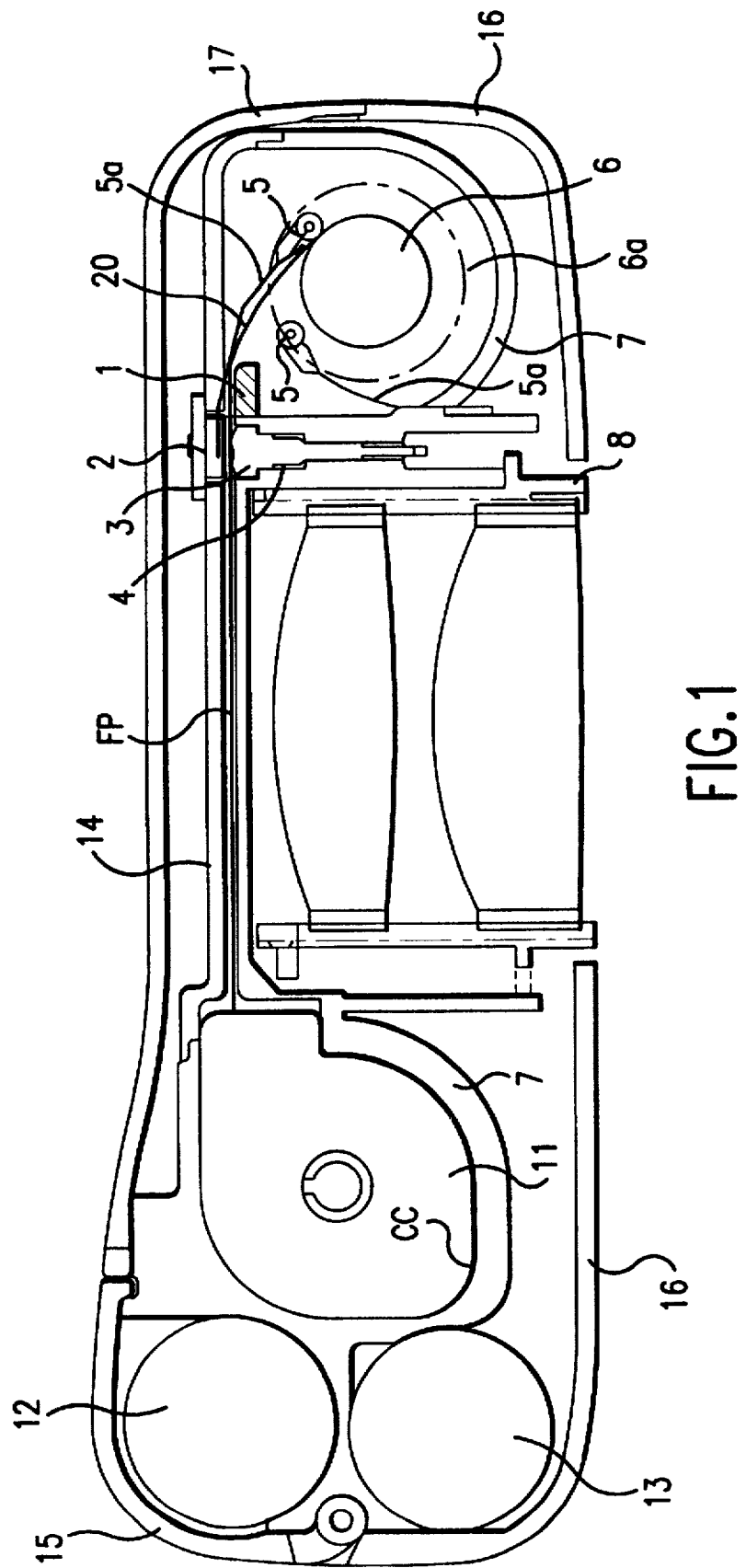
FIG. 1 is a horizontal cross-sectional view of a camera embodying the invention.
Figure 2:
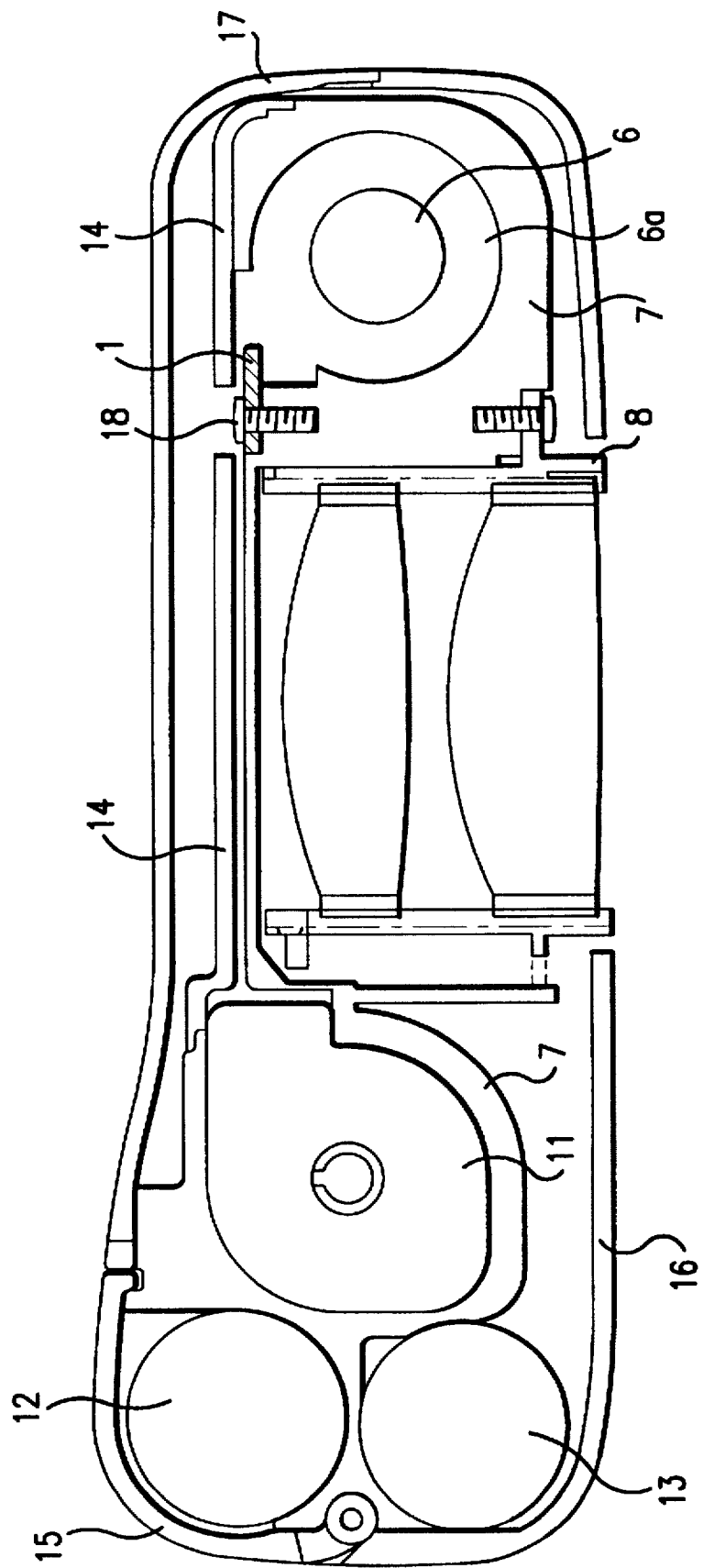
FIG. 2 is another horizontal cross-sectional view of the camera of FIG. 1.

FIGS. 1 and 2 are horizontal cross-sectional views of a first embodiment of the invention. FIG. 1 is a cross-section taken through the lower portion of the camera. FIG. 2 is a cross-section through an upper portion of the camera.

Figure 3:
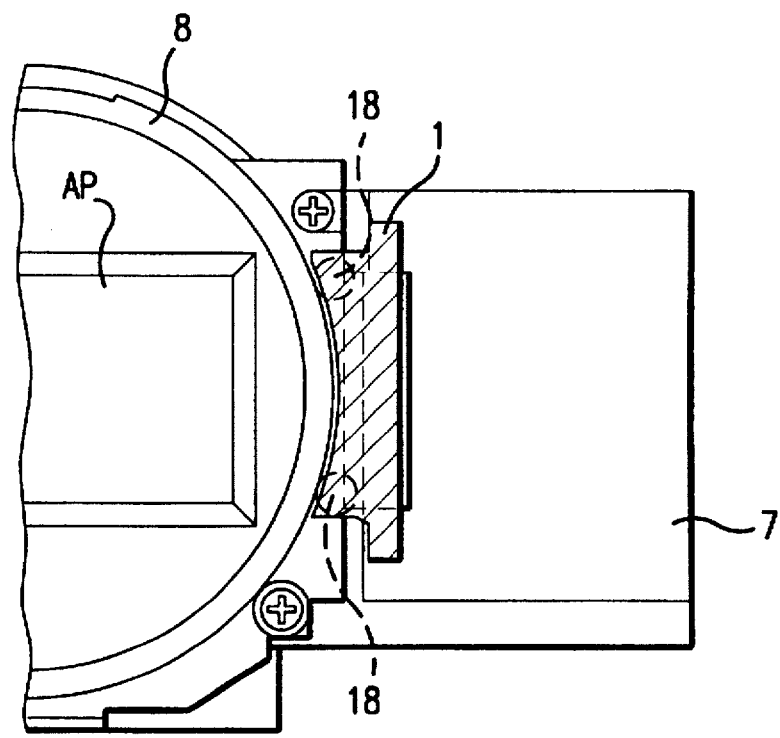
FIG. 3 is a partial front view of the camera of FIG. 1, wherein a front cover is removed.

The camera body 7 includes a cartridge chamber CC, which receives a film cartridge 11. A spool chamber 6a has a film take-up spool 6. An aperture AP (as seen in FIG. 3) admits light from a photographic subject onto the film. A pressure plate 14 forms a film path FP through the camera body 7. Film 20 that has been fed from the film cartridge 11 is led to the spool chamber 6a through the film path FP, and is wound up on the take-up spool 6. A pair of film rollers 5 push the film 20 onto the take-up spool 6. Each of the film rollers 5 is attached to the camera body 7 by a spring 5a. A battery power source 12 and a capacitor 13 for firing an electronic flash device are housed in the camera body 7. The camera body includes a battery cover 15, a front cover 16 and a rear cover 17. The front and rear covers 16 and 17 comprise the exterior of the camera.

Figure 4:
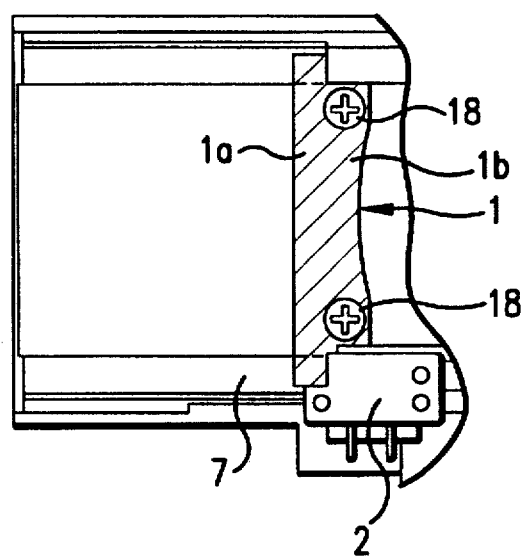
FIG. 4 is a partial rear elevation view of the camera of FIG. 1, wherein a back cover and a pressure plate are removed.

A film guide 1 guides the film 20 to the take-up spool 6. The film guide 1 comprises a guide portion 1a and an attachment portion 1b, which has an arcuate vertical cross-sectional shape, as shown in FIG. 4. The film guide 1 is positioned so that the arcuate attachment portion 1b is located along the periphery of a cylindrical lens barrel box 8. The attachment portion 1b is fixed to a rear inner surface of the camera body 7, and is screwed to the camera body by screws 18 from the back of the camera. The guide portion 1a projects from the end of the film path FP, on the spool chamber side, toward the spool chamber 6a, and parallel to the film path FP. The film guide 1 is preferably made of material having a small coefficient of friction to reduce the sliding friction resistance between the film 20 and the film guide 1.

Although FIG. 3, which is a partial front view of the camera, shows the film guide 1 for the purpose of clarifying the physical location of the film guide 1, the film guide cannot be seen from the front of the camera due to intervening film guiding and film winding mechanisms.

A magnetic head 2 for performing magnetic recording is supported at the bottom of the pressure plate 14. A pad 3 is attached to the camera body 7. The pad 3 is forced by a pad spring 4 toward the magnetic head, thereby pressing the magnetic recording area of the film 20 against the magnetic head 2. The magnetic head 2 and the pad 3 are provided on the spool chamber 6a side of the aperture AP. When a film frame advances after an exposure operation is conducted, magnetic information may be recorded on a magnetic recording area of film corresponding to the exposed frame.

When the cartridge 11 is loaded in the cartridge chamber CC, the film 20 is fed out of the cartridge 11 by a film feeding device (not shown) to carry out film loading. Simultaneously, the take-up spool 6 is rotated. The film 20 that has been fed from the cartridge 11 passes through the film path FP and further passes between the magnetic head 2 and the pad 3 into the spool chamber 6a. The film 20 is then guided by the film guide 1 to the take-up spool 6. When the film 20 reaches the take-up spool 6, the film 20 is pressed against the take-up spool 6 by the film rollers 5, and is wound up, in a clockwise direction, on the take-up spool 6. When the first frame of the film 20 is aligned with the aperture AP, the film feeding operation stops. Every time an exposure operation is conducted, the film 20 is advanced one frame and magnetic recording may be performed on the magnetic recording area on the film by the magnetic head. When all the film has been exposed, the amount of film wound around the take-up spool 6 reaches a peak, as shown by the two dot broken line in FIG. 1. However, even in this state, the film guide 1 does not contact the film 20 wound on the take-up spool 6.

Because the film guide 1 properly guides the film 20 that has been fed to the spool chamber 6a to the take-up spool 6, film loading errors are reduced as compared to cameras without a film guide. In addition, the film guide ensures that magnetic recording is properly performed, as described below.

Figure 5:
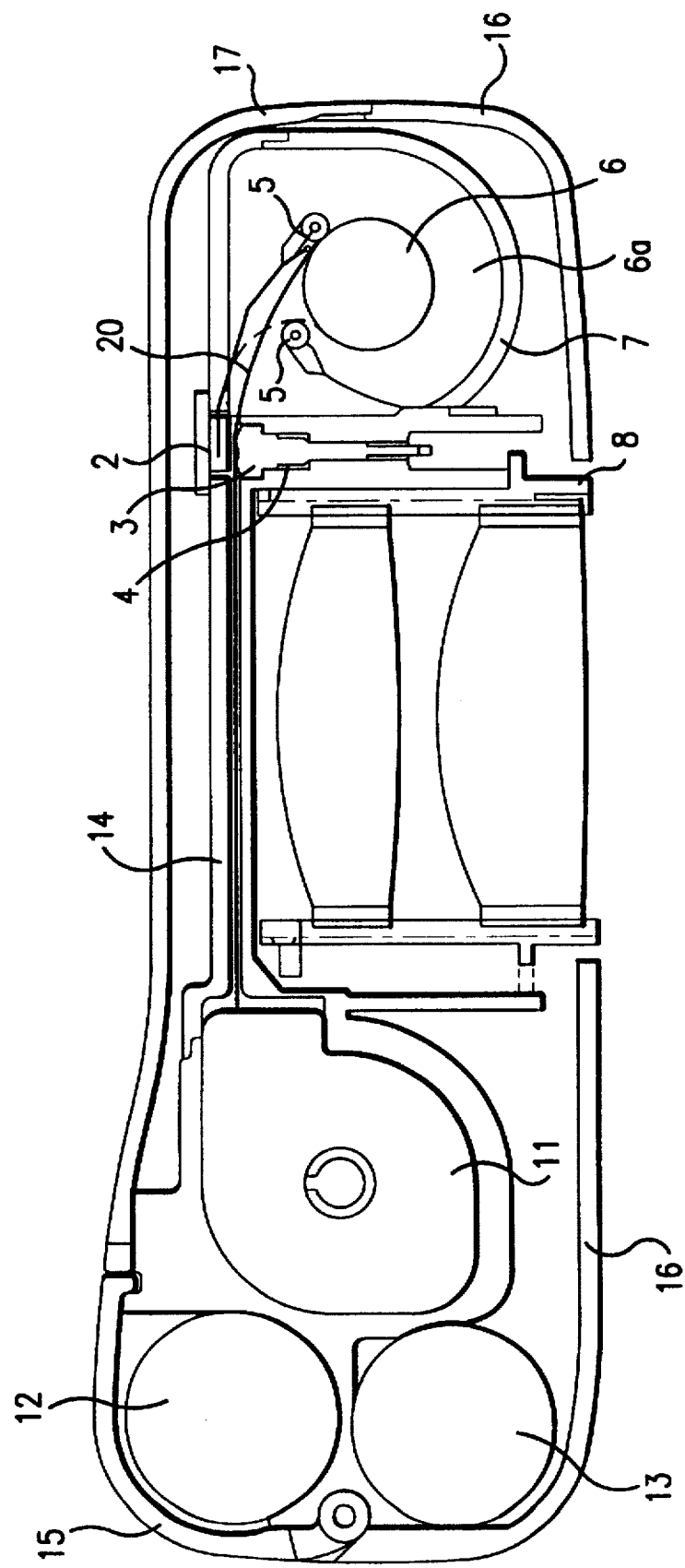
FIG. 5 is a horizontal cross-sectional view of a prior art camera without a film guide.

FIG. 5 illustrates a camera that does not have a film guide. During film loading, the film 20 tends to curl downward due to the fact that the film has been stored in a curled orientation within the film cartridge 11. Because the film 20 tends to curl, it may not be properly led to the take-up spool 6, after passing the magnetic head 2 and the pad 3. In other words, the film 20 may attempt to wind around the take-up spool 6 in a counterclockwise direction, as shown by the dashed line in FIG. 5. This causes a failure of film loading because the film 20 cannot be wound in the proper, clockwise direction on the spool 6.

In a camera having a film guide, however, the film 20 is reliably guided to the take-up spool 6 so that it will be wound around the take-up spool 6 in the clockwise direction. Thus, a camera embodying the invention keeps film loading errors to a minimum, even when the film 20 tends to curl.

In view of the demand for miniaturization, especially a demand for reducing the width of the camera as much as possible, the spool chamber 6a preferably is positioned closely adjacent to the magnetic head 2 and the pad 3, as shown in FIGS. 1 and 2. Accordingly, the magnetic head is provided in the vicinity of the exit of the film path FP. If no film guide 1 is provided in the camera, as shown in FIG. 5, the moving direction of the film 20 may vary near the magnetic head 2, and the film 20 does not uniformly contact the magnetic head 2. The movement of the film 20 prevents stable magnetic recording.

In cameras embodying the invention, however, the film guide 1 extends parallel to the film path FP. The film guide 1 prevents the moving direction of the film 20 from varying near the magnetic head 2, thus the film 20 uniformly contacts the magnetic head 2. This ensures that magnetic recording is reliably conducted.

In embodiments of the invention, the attachment portion 1b of the film guide 1 is positioned along the outer periphery of the lens barrel box 8. The upper and lower edges of the arc-shaped attachment portion 1b (i.e., the edges extending toward the center of the camera) are fixed by screws 18 to camera body 7. In this structure, the internal space in the camera is effectively used, which prevents the camera size from becoming large.

When the film guide 1 is formed as a separate unit from the camera body 7, the structure of the mold for molding the camera body is simplified. However, in alternative embodiments of the invention, the camera body 7 and the film guide 1 may be unitarily formed (i.e., a one-piece construction).

The magnetic head 2 is not limited to simply recording information. The magnetic head may be a read only head, a record only head, or a read/record head.

Also, although the invention has been described in connection with a camera, the invention can be applied to any apparatus using photographic film. For instance, the invention could be utilized in an apparatus for projecting a photographic image recorded on film onto a TV screen.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An apparatus that uses a film that is drawn out of a film cartridge, comprising:

a film cartridge chamber that receives a film cartridge loaded in the apparatus;

a take-up spool located in a spool chamber that winds up film that has been drawn out of the film cartridge;

a film path extending between the film cartridge chamber and the spool chamber; and a film guide located at the spool chamber side of the film path and fixedly attached to a body of the apparatus, the film guide having a guide surface that is parallel to the film path and extending into the spool chamber and toward the take-up spool to ensure that film drawn out of the film cartridge is properly wound around the take-up spool.

2. An apparatus according to Claim 1, further comprising a lens barrel portion, and wherein the film guide comprises an attachment portion that is joined adjacent to an outer periphery of the lens barrel portion.

3. An apparatus according to Claim 2, wherein the attachment portion of the film guide has an arcuate shape that conforms to the outer periphery of the lens barrel portion.

4. An apparatus according to Claim 1, wherein the film guide has a length and is positioned such that an end surface of the film guide closest to the take-up spool does not contact film wound on the take-up spool, regardless of the amount of film wound on the take-up spool.

5. An apparatus according to Claim 1, further comprising a magnetic head located adjacent the spool chamber side of the film path, the magnetic head performing at least one of a recording operation to magnetically record information on film passing the magnetic head and a reading operation to read information magnetically recorded on film passing the magnetic head, and wherein the film guide extends substantially parallel to the film path, into the spool chamber, to ensure that operations are reliably performed on the film by the magnetic head.

6. An apparatus according to Claim 5, wherein an end surface of the film guide facing the take-up spool is located closer to the take-up spool than the magnetic head.

7. An apparatus according to Claim 5, further comprising a lens barrel portion, and wherein the film guide comprises an attachment portion having an arcuate shape that is joined adjacent to an outer periphery of the lens barrel portion.

8. An apparatus according to Claim 5, wherein the film guide has a length and is positioned such that an end surface of the film guide closest to the take-up spool does not contact film wound on the take-up spool, regardless of the amount of film wound on the take-up spool.

9. An apparatus that uses a film that is drawn out of a film cartridge, comprising:

chamber means for holding a film cartridge loaded in the apparatus;

take-up means for winding up film that has been drawn out of the film cartridge, the take-up means being located in a spool chamber;

path means for forming a film movement path between the chamber means and the spool chamber; and guide means for preventing film that has been drawn out of the film cartridge from prematurely curling upon entry of the film into the spool chamber, the guide means being located in the spool chamber and fixedly attached to a body of the apparatus, the guide means having only one guide surface extending in a plane that is parallel to the path means.

10. An apparatus according to Claim 9, further comprising a lens barrel portion, and wherein the guide means comprises an attachment portion joined adjacent to an outer periphery of the lens barrel portion.

11. An apparatus according to Claim 10, wherein the attachment portion of the guide means has an arcuate shape that conforms to the outer periphery of the lens barrel portion.

12. An apparatus according to Claim 9, wherein the guide means has a length and is positioned such that an end surface of the guide means closest to the take-up means does not contact film wound on the take-up means, regardless of the amount of film wound on the take-up means.

13. An apparatus according to Claim 9, further comprising magnetic means for performing at least one of a recording operation for magnetically recording information on film passing the magnetic means and a reading operation for reading information magnetically recorded on film passing the magnetic means, the magnetic means being located adjacent the spool chamber side of the path means, and wherein the guide means extends substantially parallel to the film movement path, into the spool chamber, to ensure that operations are reliably performed on the film by the magnetic means.

14. An apparatus according to Claim 13, wherein an end surface of the guide means facing the take-up means is located closer to the take-up means than the magnetic means.

15. An apparatus according to Claim 13, further comprising a lens barrel portion, and wherein the guide means comprises an attachment portion having an arcuate shape that is joined adjacent to an outer periphery of the lens barrel portion.

16. An apparatus according to Claim 13, wherein the guide means has a length and is positioned such that an end surface of the guide means closest to the take-up means does not contact film wound on the take-up means, regardless of the amount of film wound on the take-up means.

17. An apparatus according to Claim 9, wherein the guide means includes a flat member that extends into the spool chamber.

18. An apparatus according to Claim 9, wherein the spool chamber includes an inlet through which the film enters the spool chamber from the path means, and wherein the guide means includes a member that extends into the spool chamber adjacent to the spool chamber inlet.

19. An apparatus according to Claim 18, wherein the path means is planar, and the guide means member extends parallel to the planar path means.

20. An apparatus according to Claim 18, wherein the guide means member is flat.

* * * * *